(12) United States Patent
Uduka et al.

(10) Patent No.: US 7,513,176 B2
(45) Date of Patent: Apr. 7, 2009

(54) FLYWHEEL DEVICE FOR PRIME MOVER

(75) Inventors: Naoto Uduka, Saitama-ken (JP); Yutaka Tsunoda, Saitama-ken (JP); Yukio Morohoshi, Saitama-ken (JP); Toshifumi Yamada, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 803 days.

(21) Appl. No.: 10/953,286

(22) Filed: Sep. 30, 2004

(65) Prior Publication Data

US 2005/0076739 A1    Apr. 14, 2005

(30) Foreign Application Priority Data

| Oct. 14, 2003 | (JP) | ............................. 2003/354308 |
| Oct. 14, 2003 | (JP) | ............................. 2003/354309 |
| Nov. 11, 2003 | (JP) | ............................. 2003/381811 |
| Nov. 11, 2003 | (JP) | ............................. 2003/381812 |

(51) Int. Cl.
*F16F 15/12* (2006.01)

(52) U.S. Cl. .................. 74/574.3; 192/55.61; 192/201; 192/70.17

(58) Field of Classification Search ................ 74/572.2, 74/574.2–574.4; 192/55.61, 201, 213.31, 192/70.17; 464/45–47
See application file for complete search history.

(56) References Cited

U.S. PATENT DOCUMENTS

| 4,545,470 A | * | 10/1985 | Grimm | .......................... 464/36 |
| 5,070,979 A | * | 12/1991 | Ohtsuka et al. | ............. 192/54.4 |
| 5,503,595 A | * | 4/1996 | Rohrle | ........................ 464/68.4 |

* cited by examiner

*Primary Examiner*—Richard W L Ridley
*Assistant Examiner*—Terence Boes
(74) *Attorney, Agent, or Firm*—Westerman, Hattori, Daniels & Adrian, LLP.

(57) ABSTRACT

A flywheel device for a prime mover, which enables stable transmission of torque from a prime mover to a driven shaft, and can be formed compact in size. A first flywheel is provided on the crankshaft of an internal combustion engine. A second flywheel has a friction surface, and is connected to the input shaft of a transmission via a friction switch for urging the friction surface. A spring mechanism is connected between the two flywheels, for damping torsional vibrations of the crankshaft. The first and second flywheels has a groove that is formed in one of them, and extends circumferentially at a radial location corresponding to the friction surface, a flange that is formed in the other of them, and is fitted in the groove, and a brush bearing provided in the groove for rotatably supporting the flywheels.

7 Claims, 2 Drawing Sheets

FLYWHEEL DEVICE FOR PRIME MOVER

BACKGROUND OF THE INVENTION

1. Field of the Invention

This invention relates to a flywheel device for a prime mover, used in a drive system e.g. of an automotive vehicle, for transmitting the torque of the prime mover while reducing torque variation and torsional vibrations.

2. Description of the Related Art

Conventionally, a flywheel device of this kind has been disclosed e.g. in Japanese Laid-Open Patent Publication No. H10-196724 (Page 5, FIG. 4). The flywheel device is a unitary assembly disposed between an internal combustion engine and a clutch, which is composed of a first rotary mass member coaxially mounted on the crankshaft of the engine, a second rotary mass member connected to the input shaft of a transmission via a clutch, and a damper and a friction device disposed between the first and second rotary mass members.

The damper is provided for damping torsional vibrations of the crankshaft, and includes a plurality of coil springs arranged on the first rotary mass member at circumferentially spaced intervals. These coil springs are each connected to both of the first and second rotary mass members. As the crankshaft rotates, the rotation of the crankshaft is transmitted from the first rotary mass member to the second rotary mass member via the coil springs of the damper, and further via the clutch, if engaged, to the input shaft of the transmission. In this process, the first and second rotary mass members reduce variation in the torque of the engine, while the damper reduces torsional vibrations.

If the damper alone is provided, when the clutch is not engaged, e.g. during the start of the engine, and the engine rotates at a relatively low engine speed without load other than the flywheel device, torsional vibrations tend to occur between the two rotary mass members, which tends to apply large load particularly to joints where the flywheel device are connected with the crankshaft and other components. The friction device prevents the torsional vibrations from occurring between the two rotary mass members e.g. during the start of the engine, and is comprised of a friction shoe that is disposed outward of the damper in the radial direction of the crankshaft and has a width progressively reduced in a tapered manner as the friction shoe extends inward in the radial direction of the crankshaft, and a shoe-abutting portion that is formed as a sloping surface of the first rotary mass member and in contact with a tapered side surface of the friction shoe. The second rotary mass member is formed with a protruding portion that protrudes from an outer end thereof toward the first rotary mass member, and has a spring attached to the inside of the protruding portion. The friction shoe, which is urged radially inward by the spring, urges the shoe-abutting portion of the first rotary mass member and an engine-side surface of the second rotary mass member.

According to the flywheel device described above, the damper and the friction device are rotated together with the first and second rotary mass members as the engine rotates. In the process, when the engine speed is low, the urging force of the spring overcomes the centrifugal force acting on the friction shoe to generate frictional forces between the friction shoe and the two rotary mass members. The frictional forces act as rotational resistance between the two members. This prevents generation of torsional vibrations during low engine speed, which cannot be prevented by the damper alone. When the engine speed rises to a certain point, the centrifugal force acting on the friction shoe overcomes the urging force of the spring, so that the friction shoe is moved radially outward against the urging force of the spring to be disconnected from the first rotary mass member, causing the frictional forces to stop acting between the friction shoe and the two rotary mass members. This enables the damper to reduce the torsional vibrations of the crankshaft, and torque with the reduced torsional vibrations is transmitted to the input shaft. Thus, the variation in the torque and the torsional vibrations can be properly damped according to the engine speed, whereby the torque can be stably transmitted to the input shaft.

However, the conventional flywheel device proposed in Japanese Laid-Open Patent Publication No. H10-196724 suffers from the following problems: In the case of the friction device described above, to stably generate a required magnitude of frictional forces between the friction shoe and the two rotary mass members, it is necessary to secure a contact area which is large to some extent. For this reason, the friction device is arranged such that it extends over a relatively large length from a location corresponding to radially central points of the rotary mass members toward a location corresponding to the outer ends of the same. Further, since the rotational resistance between the two rotary mass members is changed by moving the friction shoe in the radial direction, it is necessary to secure a radial size for the stroke of motion of the friction shoe, so that the size of the friction device is increased particularly in the radial direction. Accordingly, when the flywheel device is constructed by using such a friction device, the size of the entire flywheel device is increased. Moreover, when the clutch is engaged, the second rotary mass member is pressed toward the first rotary mass member, whereby the friction shoe is sandwiched between the two rotary mass members, causing the resulting load to act on the friction device, which can vary the magnitude of the frictional forces generated thereby to make it impossible to obtain the required magnitude of frictional forces. This makes it impossible to ensure stable operation of the flywheel device, and stably transmit the torque of the engine to the input shaft of the transmission.

SUMMARY OF THE INVENTION

It is a first object of the invention to provide a flywheel device for a prime mover, which enables stable transmission of torque from a prime mover to a driven shaft and can be formed compact in size.

It is a second object of the invention to provide a flywheel device for a prime mover, which enables stable transmission of torque from a prime mover to a driven shaft, and is compact in size and high in durability.

To attain the first object, in a first aspect of the present invention, there is provided a flywheel device for a prime mover, disposed between an output shaft of the prime mover and a driven shaft driven by the output shaft, for transmitting torque of the prime mover to the driven shaft, while reducing torque variation and torsional vibrations, comprising:

a first rotary mass member in the form of a disk provided on the output shaft;

a second rotary mass member in the form of a disk disposed in a manner opposed to the first rotary mass member in an axial direction along an axis of the output shaft via respective opposed surfaces of the first and second rotary mass members, the second rotary mass member having a friction surface on an opposite side from the opposed surfaces, and being connected to the driven shaft via a friction clutch for urging the friction surface; and a spring mechanism connected between the first and second rotary mass members, for damping torsional vibrations of the output shaft, wherein the first and second rotary mass members have:

a groove formed in one of the opposed surfaces of one of the first and second rotary mass members, such that the groove circumferentially extends at a radial location corresponding to the friction surface;

a flange formed on the other of the opposed surfaces of the other of the first and second rotary mass members in a manner protruding therefrom, such that the flange extends circumferentially and is fitted in the groove; and a bearing provided with the groove, such that the bearing is sandwiched between the groove and the flange in the axial direction, and supports the first and second rotary mass members such that the first and second rotary mass members are rotatable with respect to each other.

With the arrangement of this flywheel device, between the first rotary mass member provided on the output shaft and the second rotary mass member connected to the driven shaft via the friction clutch, there is disposed the spring mechanism which transmits the torque of the prime mover to the driven shaft of the transmission while reducing torsional vibrations of the output shaft. Further, the groove is formed in one of the opposed surfaces of one of the first and second rotary mass members while the flange is formed in the other of the opposed surfaces, such that the groove and the flange extend circumferentially and the flange is fitted in the groove. These are pressed by the friction clutch which connects the second rotary mass member to the driven shaft, and disposed at approximately the same radial location as that of the friction surface of the second rotary mass member. Within the groove, the bearing is provided which is sandwiched in the axial direction by the groove and the flange, and supports the two rotary mass members such that they are rotatable with respect to each other. Further, when the friction clutch is engaged, the urging force acting on the friction surface of the second rotary mass member is supported by the second rotary mass member, and via the bearing sandwiched between the flange and the groove by the first rotary mass member.

As described above, the friction surface, and the groove and the flange are at approximately the same radial location as that of the friction clutch, that is, the location where the urging force of the friction clutch acts and the location of the support which supports the urging force are substantially aligned with each other in the axial direction, and the first and second rotary mass members support the urging force in unison with each other. Therefore, it is possible to suppress bending (falling) of the two rotary mass members in the direction of urging of the friction clutch. This makes it possible to maintain the stable operation of the flywheel device. Further, since the first and second rotary mass members are fitted to each other via the flange and the groove, the two rotary mass members can be accurately and easily positioned in the axial and radial directions with respect to each other only by simply fitting the flange in the groove when the flywheel device is assembled. Therefore, inspection after the assembly can be simplified, for example, to thereby reduce the cost of manufacturing management. Further, since the bearing supports the two rotary mass members in a manner rotatable with respect to each other, it is possible to ensure the stable relative motions of the two rotary mass members, and the effects of damping torsional vibrations by the spring mechanism.

Preferably, the one of the opposed surfaces of the one of the first and second rotary mass members has a first flange and a second flange formed thereon such that the first and second flanges protrude toward the other of the opposed surfaces of the other of the first and second rotary mass members, and circumferentially extends in radially parallel relationship to define the groove therebetween.

With the arrangement of this preferred embodiment, in the groove formed between the first and second flanges which protrude from the one of the first and second rotary mass members toward the other of the same, and circumferentially extend in radially parallel relationship, the flange of the other of the first and second rotary mass members is fitted. This makes it possible to secure space between the two rotary mass members on opposite sides of the first and second flanges in the radial direction, and therefore, the spring mechanism and other mechanisms can be disposed in the space, whereby the entire flywheel device can be formed compact in size. Further, as described above, the urging force from the friction clutch is supported by the two rotary mass members, and does not directly act on the spring mechanism and the like, so that it is possible to stably ensure the effects of damping torsional vibrations by the spring mechanism.

Preferably, the other of the first and second rotary mass members has spline grooves formed in a peripheral surface of the flange and extending in the axial direction, and the spring mechanism comprises torsion springs provided on the other of the first and second rotary mass members, a spring-receiving flange engaged with the torsion springs, and spline-engaged with the spline grooves at one end of the spline-receiving flange, for transmitting torque of the output shaft from the first rotary mass member to the second rotary mass member.

With the arrangement of this preferred embodiment, the torque of the prime mover is transmitted to the driven shaft via the torsion springs provided on the one of the first and second rotary mass members, and the spring-receiving flange that is engaged with the torsion springs and spline-engaged with the spline grooves formed in the flange of the other of the first and second rotary mass members. Therefore, it is possible to effect the spline engagement of the spring-receiving flange with the flange of the other of the first and second rotary mass members only by engaging the one end of the spring-receiving flange with the spline grooves formed in the outer peripheral surface of the flange and sliding the same thereon, whereby assembly of the first and second rotary mass members including the spring mechanism is facilitated. This contributes to simplified assembly of the flywheel device. Further, due to the spline engagement between the flange and the spring-receiving flange, a desired play (backlash) can be set to the mating therebetween. This makes it possible to increase the freedom of setting damping characteristics of the spring mechanism in damping torsional vibrations, e.g. configuring the settings of the response of the spring mechanism against the torsional vibrations.

More preferably, the one of the first and second rotary mass members further comprises a cover member covering the torsion springs and the spring-receiving flange, in a state in which the one end of the spring receiving flange protrudes into the spline grooves of the flange, and sealing members for sealing between the spring-receiving flange and the one of the first and second rotary mass members, and between the spring-receiving flange and the cover member.

With the arrangement of this preferred embodiment, the torsion springs and the spring-receiving flange in engagement therewith are covered by the cover member, and the one end of the spring-receiving flange protrudes toward the flange beyond the cover member such that it can be spline-engaged with the spline grooves of the flange. Further, the torsion springs are enclosed by the one of the first and second rotary mass members and the cover member provided thereon, and the sealing members hermetically seal between the cover member and the spring-receiving flange and between the spring-receiving flange and the one of the first and second rotary mass members.

As described above, by providing the cover member and the sealing members, it is possible to easily hermetically seal the torsion springs in a state enclosed by the cover member and so forth. This makes it possible to prevent leakage of grease filled around the torsion springs for ensuring smooth operation of the spring mechanism, and thereby positively ensure the smooth operation of the spring mechanism. Further, since the gaps between the spring-receiving flange, and the one of the two rotary mass members and the cover member can be eliminated, it is possible to restrict the axial motion of the spring-receiving flange. This makes it possible to cause the spring mechanism to stably operate, so that the smoother operation of the spring mechanism can be ensured.

To attain the second object, in a second aspect of the present invention, there is provided a flywheel device for a prime mover, disposed between an output shaft of the prime mover and a driven shaft driven by the output shaft, for transmitting torque of the prime mover to the driven shaft, while reducing torque variation and torsional vibrations, comprising:

a first rotary mass member provided on the output shaft;

a second rotary mass member connected to the driven shaft;

a spring mechanism connected between the first rotary mass member and the second rotary mass member, for damping torsional vibrations of the output shaft; and a damping mechanism disposed inward of the spring mechanism in a radial direction of the output shaft, and connected between the first rotary mass member and the second rotary mass member, for generating rotational resistance between the first rotary mass member and the second rotary mass member, wherein the damping mechanism includes:

a cam member provided such that the cam member is movable in an axial direction along an axis of the output shaft;

a holding member disposed in a manner opposed to the cam member in the axial direction;

first and second friction members disposed between the cam member and the holding member, such that the first and second friction members are connected to the first rotary mass member and the second rotary mass member, respectively, and engaged with each other;

a spring member urging the cam member toward the first and second friction members to thereby cause frictional forces to be generated between the first and second friction members due to pressing of the first and second friction member by the cam member; and a weight member held between the cam member and the holding member, such that as the rotational speed of the prime mover rises, the weight member causes the cam member to be moved in a direction away from the first and second friction members against the urging force of the spring member, to thereby reduce the frictional forces.

With the arrangement of this flywheel device, the spring mechanism is disposed between the first rotary mass member provided on the output shaft and the second rotary mass member connected to the driven shaft, and the torsional vibrations of the output shaft are damped by the spring mechanism. Further, at a location inward of the spring mechanism in the radial direction of the output shaft, there is disposed the damping mechanism, and rotational resistance is generated between the first and second rotary mass members by the damping mechanism. More specifically, when the rotational speed of the prime mover is low, the urging force of the spring member causes the cam member movable in the axial direction to press the first and second friction members, whereby frictional forces are generated between the first and second friction members. The frictional forces act as rotational resistance between the first and second rotary mass members. This damps the torsional vibrations which tend to occur between the rotary mass members when the rotational speed of the prime mover is low.

The weight member held between the cam member and the holding member, for pressing the first and second friction members move the cam member in a direction away from the two friction members against the urging force of the spring member through a stoke dependent on the rise in the rotational speed of the prime mover, thereby reducing the frictional forces between the friction members. That is, the magnitude of rotational resistance between the first and second rotary mass members is determined by the relationship between the urging force of the spring member and the rotational speed of the prime mover, and as the rotational speed of the prime mover rises, the proportion of torque transmitted via the damping mechanism decreases, whereas the proportion of torque transmitted via the spring mechanism increases, whereby the damping of the torsional vibrations can be effectively attained when the rotational speed of the prime mover is high.

Further, since the cam member is moved by the weight member, the stroke thereof is continuously changed according to the rotational speed of the prime mover, so that the damping mechanism can smoothly change the rotational resistance between the first and second rotary mass members in a manner following the change in the rotational speed of the prime mover. Therefore, the proportion between respective parts of torque of the prime mover transmitted via the spring mechanism and the damping mechanism is changed smoothly according to the rotational speed of the prime mover. This makes it possible to cause the spring mechanism and the damping mechanism to perform damping of the torsional vibrations of the output shaft in a proper proportion dependent on the rotational speed of the prime mover. Thus, the torque can be stably transmitted to the driven shaft irrespective of the rotational speed of the prime mover.

Further, as described hereinbefore, the damping mechanism is disposed inward of the spring mechanism in the radial direction of the output shaft. Conventionally, the spring mechanism is mainly composed of coil springs and hence is relatively light in weight, whereas the damping mechanism is composed of lots of parts as described hereinabove, and hence is heavy in weight. Therefore, according to the present invention, by disposing the spring mechanism light in weight at an outer location and the damping mechanism relatively heavy in weight at an inner location, the weight distribution of the flywheel device can be biased toward the axis of the output shaft. This makes it possible to reduce the moment of inertia of the flywheel device. As a result, the torsional moment acting on the joints between the flywheel device, and the output shaft of the prime mover and the driven shaft of the transmission can be reduced, which contributes to the increased durability of the drive system including the flywheel device.

Further, since the damping mechanism is composed of lots of parts, as described above, depending on variations in the dimensional accuracy and assembly accuracy of each part, variation in the weight or mass distribution of the assembled damping mechanism is also liable to occur. However, even in such a case, due to disposition of the damping mechanism at a location closer to the output shaft, the moment of inertia of the entire flywheel device is less affected by such variation. This reduces variation in rotational characteristics of the flywheel device caused by variations in the weight and the like of the damping mechanism. Therefore, it becomes unnecessary to provide strict control on the weight of each part so as to preserve uniformity thereof, so that it is possible to reduce the control cost of parts subjected to mass production, and hence reduce the manufacturing costs of the flywheel device.

Further, although in the conventional friction device, the friction shoe is moved in the radial direction to thereby generate rotational resistance, the damping mechanism causes the cam member to be moved in the axial direction to thereby generate the rotational resistance between the rotary mass members. Therefore, it is not necessary to secure a very large length in the radial direction. This makes it possible to configure the damping mechanism such that it is compact in size in the radial direction, and hence increase the freedom of arrangement of the spring mechanism.

Preferably, the second rotary mass member has an annular shape having an opening coaxial with the axis of the output shaft, and has a spline groove formed in an inner peripheral surface of the opening such that the spline groove extends in the axial direction, and the second friction member is engaged with the spline groove of the second rotary mass member.

With the arrangement of the preferred embodiment, the second friction member can be spline-engaged engaged with the second rotary mass member only by causing the same to be engaged with the spline groove formed in the inner peripheral surface of the opening of the second rotary mass member, and sliding it in the axial direction, which makes it possible to mount the second friction member on the second rotary mass member with ease. This makes it possible to simplify the assembly of the flywheel device.

Preferably, one of the first rotary mass member and the holding member has a protruding portion protruding toward the other of the first rotary mass member and the holding member, and the other of the first rotary mass member and the holding member has a recess formed at a location opposed to the protruding portion in the axial direction, for having the protruding portion fitted therein.

With the arrangement of the preferred embodiment, the first rotary mass member and the holding member is assembled in a state properly positioned with respect to each other, by causing the protrusion formed on one of them to be fitted in the recess formed on the other. Therefore, in assembling the flywheel device, it is not only possible to mount the one on the other only by fitting the protrusion of the former in the recess of the latter, but also to position the two components with accuracy. This makes it possible to simplify inspection after the assembly, to thereby reduce the cost of manufacturing management.

Preferably, the first rotary mass member further has an engaging portion for having the spring member mounted thereat, and the spring member comprises a coned disc spring having an annular shape and disposed around the output shaft, the coned disc spring having an inner end fixedly engaged with the engaging portion of the first rotary mass member.

With the arrangement of the preferred embodiment, the spring member comprises a coned disc spring having an annular shape and disposed around the output shaft, and the inner end of the coned disc spring is fixedly engaged with the engaging portion formed on the first rotary mass member. This configuration enables the positioning of the spring member to be easily carried out only by causing the spring member to be fixedly engaged with the engaging portion of the first rotary mass member, thereby facilitating assembly of the flywheel device.

Preferably, the second rotary mass member is connected to the driven shaft via a friction clutch, and has a friction surface on which acts the urging force of the friction clutch, and the first and second friction members are disposed at respective locations displaced in the radial direction of the output shaft from the friction surface.

With the arrangement of the preferred embodiment, a friction clutch is disposed between the second rotary mass member and the driven shaft, and the urging force of the friction clutch acts on the second rotary mass member via the friction surface. Further, the first and second friction members of the damping mechanism are arranged at respective locations displaced in the radial direction of the output shaft from the friction surface of the second rotary mass member. Therefore, when the friction clutch is engaged, the urging force caused thereby is prevented from directly acting on the friction members via the second rotary mass member. That is, the frictional forces generated between the first and second friction members depend only on the relationship between the rotational speed of the prime mover and the urging force of the spring member but are not adversely affected by the urging force of the friction clutch, and hence the frictional forces do not influence the proportion of parts of the torque distributed between the spring mechanism and the damping mechanism. This makes it possible to preserve the effects of damping torsional vibrations dependent on the rotational speed of the prime mover. Further, the friction members are no longer pressed against each other or against other members by the urging force of the friction clutch, which prevents excessive frictional forces from being generated between the friction members, and therefore it is possible to enhance durability of the damping mechanism, and hence that of the flywheel device.

Preferably, the first rotary mass member and the holding member have bolt insertion holes formed therethrough at respective locations corresponding to each other, and are mounted on the output shaft using common bolts inserted though the insertion holes.

With the arrangement of the preferred embodiment, it is possible to easily mount the first rotary mass member and the holding member on the output shaft of the prime mover using the common bolts inserted through the insertion holes formed therethrough. Further, the two components can be accurately positioned with respect to the output shaft, only by aligning the bolt insertion holes thereof, and hence it is possible to reduce the cost of production management.

Preferably, the flywheel device further comprises a cover member provided on one of the first rotary mass member and the second rotary mass member, for covering the damping mechanism.

With the arrangement of the preferred embodiment, the damping mechanism is covered with the cover member provided on one of the first and second rotary mass members. Therefore, it is possible to prevent foreign matter from entering the damping mechanism without hindering the damping of torsional vibrations by the spring mechanism and the damping mechanism, and ensure smooth operation of the damping mechanism. Furthermore, e.g. when grease is filled around the first and second friction members, the cover member is mounted such the first and second friction members are hermetically sealed, whereby it is possible to prevent leakage of grease, to thereby more positively ensure the smoother operation of the damping mechanism.

Preferably, the flywheel device further comprises a cover member for covering the damping mechanism, and the first rotary mass member, the holding member, and the cover member have bolt insertion holes formed therethrough at respective locations corresponding to each other, and are mounted on the output shaft using common bolts inserted though the insertion holes.

With the arrangement of the preferred embodiment, the first rotary mass member, the holding member, and the cover member can be easily mounted on the output shaft of the prime mover by common bolts inserted through the bolt insertion holes formed therethrough. Further, only by inserting the bolts through the insertion holes with the bolt insertion holes of the three components aligned with each other, it is possible to position them with respect to the output shaft with accuracy, and hence reduce the cost of manufacturing management.

The above and other objects, features, and advantages of the invention will become more apparent from the following detailed description taken in conjunction with the accompanying drawings.

DETAILED DESCRIPTION OF THE PREFERRED EMBODIMENTS

Figure 1:
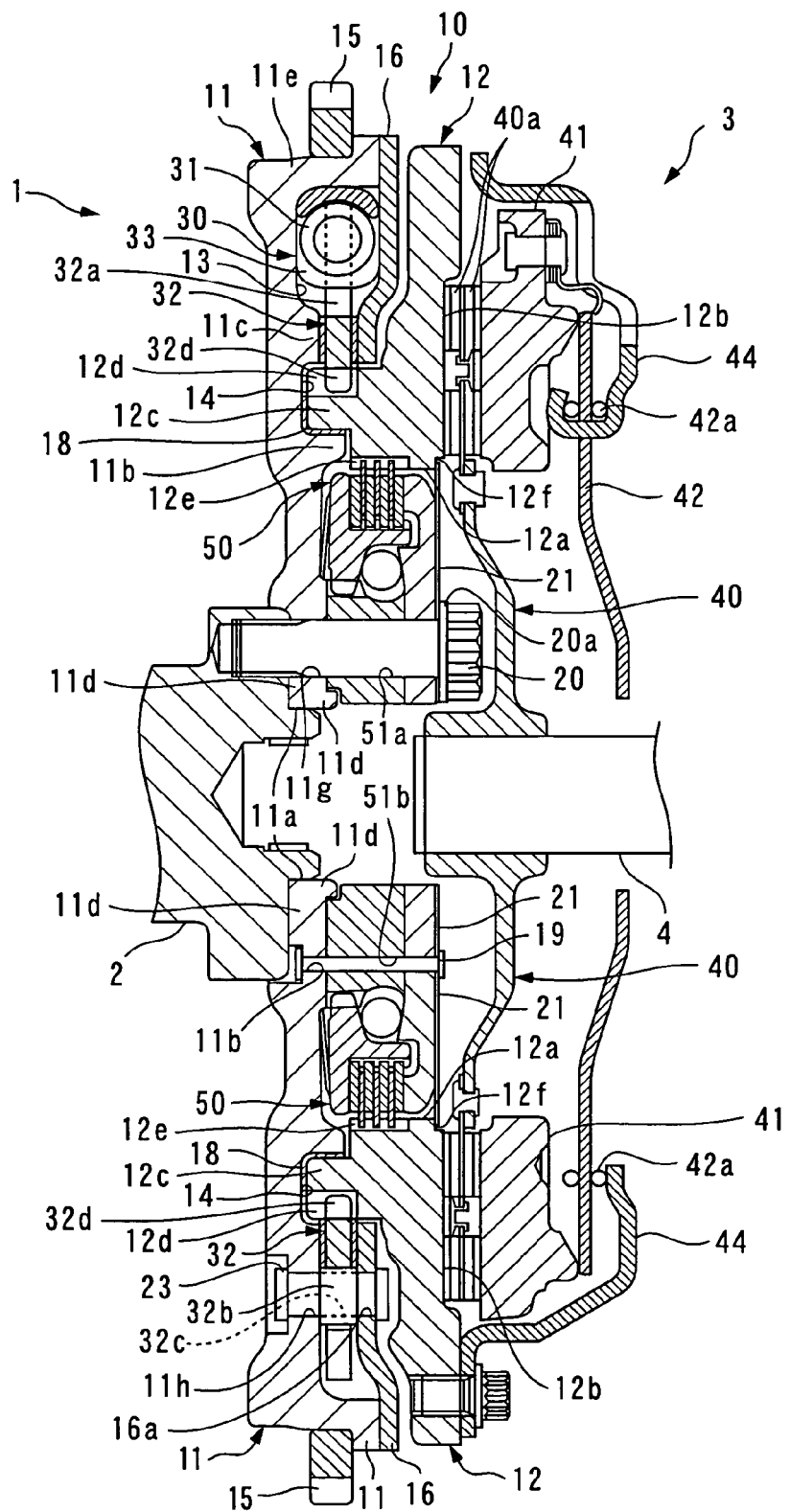
FIG. 1 is a radial cross-sectional view of part of a vehicle drive system including a flywheel device for a prime mover, according to an embodiment of the invention.
Figure 2:
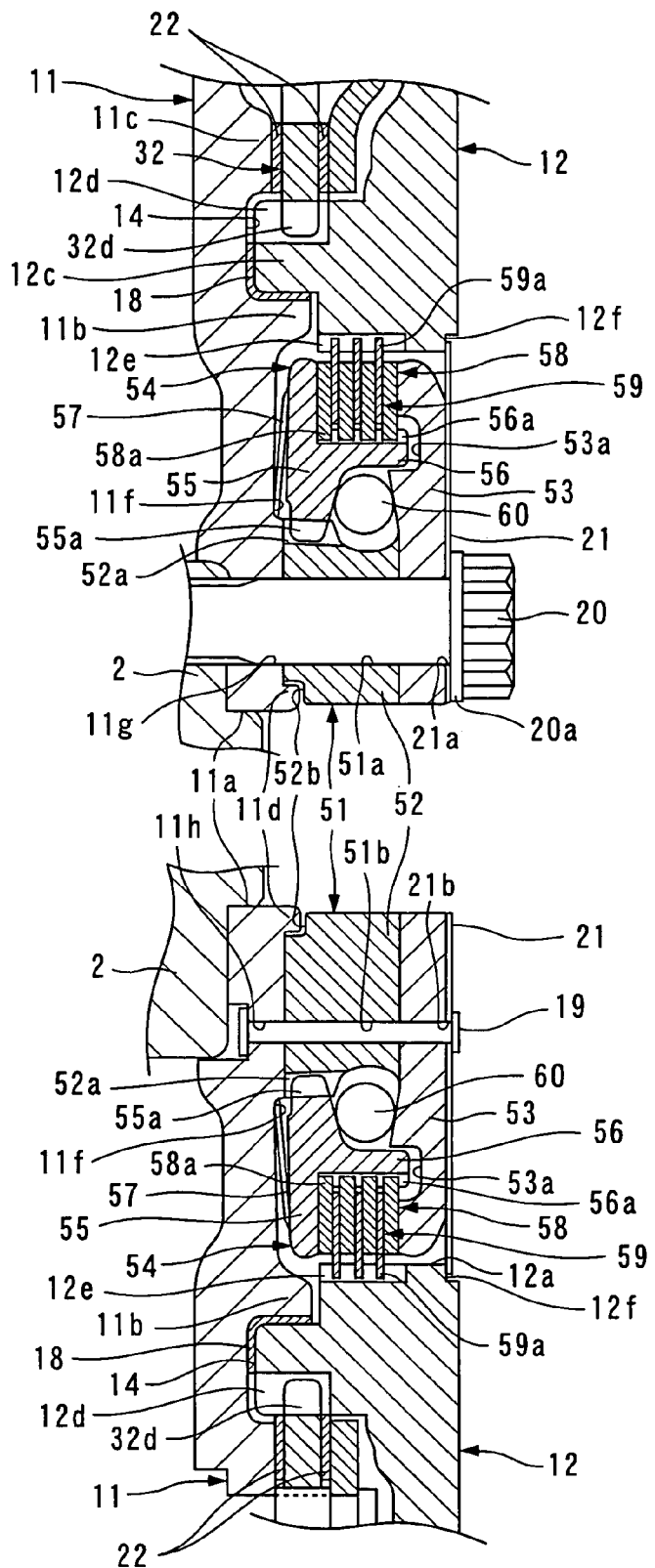
FIG. 2 is an enlarged cross-sectional view of a damping mechanism of the flywheel device shown in FIG. 1.

The present invention will now be described in detail with reference to the drawings showing a preferred embodiment thereof. FIGS. 1 and 2 schematically show part of a vehicle drive system including a flywheel device 1 for a prime mover, according to the preferred embodiment. As shown in FIGS. 1 and 2, in the vehicle drive system, the flywheel device 1 is mounted on a crankshaft 2 (output shaft) of an engine (prime mover), and connected to an input shaft 4 (driven shaft) of a transmission via a friction clutch 3. The crankshaft 2 and the input shaft 4 of the transmission are coaxially opposed to each other.

The flywheel device 1 is a unitary assembly comprised of a flywheel 10, a spring mechanism 30, and a damping mechanism 50. The flywheel 10 has a first flywheel 11 (first rotary mass member) on an engine side (left-hand side as viewed in FIG. 1), and a second flywheel 12 (second rotary mass member) on a transmission side. The two flywheel 11 and 12 are arranged such that they are coaxial with the crankshaft 2 and opposed to each other in a direction along the axis of the crankshaft 2. Hereinafter, the direction along the axis of the crankshaft 2 and the direction along the radius of the same are simply referred to as "the axial direction" and "the radial direction", respectively.

The first flywheel 11 is in the form of a disk having a radial cross-sectional shape as shown in FIG. 1. The first flywheel 11 has an opening (hole) 11a formed through a central portion thereof, and is coaxially mounted on the crankshaft 2 by rigidly fixing peripheral portions thereof around the opening 11a to the crankshaft 2 using a plurality of bolts 20 (only one of which is shown), together with a holding member 51 and a damping mechanism cover member 21, referred to hereinafter. Further, first and second flanges 11b and 11c are formed on the first flywheel 11 in this order from the radially inner side thereof, at respective locations corresponding to approximately center of the first flywheel 11, such that they are spaced from each other by a predetermined distance. The flanges 11b and 11c protrude toward the second flywheel 12, and at the same time extend circumferentially, whereby a groove 14 is formed between the two flanges 11b and 11c.

The inner end of the first flywheel 11 is formed with a protrusion 11d which protrudes toward the transmission. The protrusion 11d is used for positioning the holding member 51 when the holding member 51 is mounted on the first flywheel 11, and extends circumferentially. The outer end of the first flywheel 11 is formed with a peripheral wall 11e which protrudes toward the transmission. On an outer peripheral surface of the peripheral wall 11e is fitted a starter ring gear 15 which is driven for rotation by a starter, not shown, when the engine is started. Further, a plurality of recesses 13 (only one of which is shown) are formed between the peripheral wall 11e and the second flange 11c, at predetermined circumferentially-spaced intervals. The recesses 13 play the role of spring mechanism-accommodating chambers in each of which a torsion spring 31, referred to hereinafter, of the spring mechanism 30 is accommodated. Further, a spring mechanism cover member 16 (cover member) is attached to the peripheral wall 11e, for covering the spring mechanism 30. The spring mechanism cover member 16 is in the form of an annular plate, with the outer end thereof rigidly fixed to a transmission-side end of the peripheral wall 11e by welding. Further, the spring mechanism cover member 16 radially extends between the first and second flywheels 11 and 12, and the inner end edge thereof is at approximately the same radial location as that of the inner end edge of the second flange 11c.

The second flywheel 12 is in the form of a disk having an opening (hole) 12a formed through a central portion thereof, and has a predetermined radial cross-sectional shape. The second flywheel 12 extends from a location corresponding to a center of radius of the first flywheel 11 to a location corresponding to the outer end of the same. Further, the second flywheel 12 has a friction surface 12b formed in an area radially inward of a radial center of a transmission-side surface thereof, and the friction clutch 3 is connected to the second flywheel 12 via the friction surface 12b. At approximately the same radial location as that of the friction surface 12b, a flange 12c extends from an engine-side surface of the second flywheel 12. The flange 12c has a width (radial length) slightly smaller than that of the aforementioned groove 14 of the first flywheel 11, and extends circumferentially, for being fitted in the groove 14. Further, the flange 12c has an outer peripheral surface formed with a plurality of spline grooves 12d which extend in the axial direction, at respective locations circumferentially corresponding to the locations of the torsion springs 31 of the spring mechanism 30, whereby the flange 12c is connected to the spring mechanism 30 via the spline grooves 12d. Further, the second flywheel 12 has an inner peripheral surface formed with a plurality of spline grooves 12e at respective engine-side locations. The spline grooves 12e extend in the axial direction, and are formed circumferentially. The damping mechanism 50 is connected to the spline grooves 12e, as described hereinafter.

A bush bearing 18 (bearing) is provided in the groove 14 of the first flywheel 11. The bush bearing 18 supports the first and second flywheels 11 and 12 such that they are rotatable relative to each other, and extends circumferentially. The bush bearing 18 extends from the bottom of the groove 14 along a side wall thereof to form a L shape, and is sandwiched between the bottom and side wall of the groove 14 and the flange 12c of the second flywheel 12.

The spring mechanism 30 is comprised of the torsion springs 31 respectively accommodated in the spring mechanism-accommodating chambers, and a common spring-receiving flange 32. The spring-receiving flange 32 is in the form of an annular plate, and has an outer end formed with a plurality of arms 32a (one of which is shown) that extend outward in the radial direction at respective circumferential locations corresponding to those of the torsion springs 31 of the spring mechanism 30, two arm for each circumferential location. Further, from circumferential portions of the spring-receiving flange 32 which do not overlap the spring mechanism-accommodating chambers, a plurality of fixing portions 32b protrude outward in the radial direction, and each fixing portion 32b is formed with a rivet insertion hole 32 that extends axially therethrough and circumferentially over a predetermined length. The spring-receiving flange 32 is mounted to the first flywheel 11 by rivets 23 inserted through the rivet insertion holes 32c such that it can be circumferentially moved within a range of the circumferential length of each rivet insertion hole 32c. Further, the inner peripheral surface of the spring-receiving flange 32 is formed with a plurality of spline teeth 32d that extend in the axial direction, in a manner protruding inward in the radial direction. The spline teeth 32d are spline-engaged with the spline grooves 12d of the second flywheel 12.

Each torsion spring 31 is formed by a coil spring having a predetermined length and accommodated in an associated one of the spring mechanism-accommodating chambers 15 via a spring holder 33. The opposite ends of the torsion spring 31 are engaged with the arms 32a of the spring-receiving flange 32. Further, sealing members 22 and 22 having an annular shape are disposed in respective gaps between the spring-receiving flange 32 and the second flange 11c and between the spring-receiving flange 32 and the spring mechanism cover member 16, whereby the spring mechanism-accommodating chambers are hermetically closed.

The damping mechanism 50 is provided within the opening 12a of the second flywheel 12. As shown in FIG. 2, the damping mechanism 50 is connected between the first and second flywheels 11 and 12, for generating rotational resistance dependent on the engine speed therebetween, and is comprised of the holding member 51, a cam member 54 opposed thereto in the axial direction, and a plurality of first and second friction plates 58 and 59 (first and second friction members) disposed between the members 51 and 54, as well as a multiplicity of weight balls 60 (weight members).

The holding member 51 has an annular shape, and is comprised of a body 52 disposed toward the engine, and a collar 53 having a lager diameter than that of the body 52. The outer end of the collar 53 has an engine-side surface formed with a recess 53a that extends circumferentially. Further, the body 52 has an engine-side outer peripheral surface formed with a plurality of spline grooves 52a extending in the axial direction at predetermined circumferentially-spaced intervals, and an engine-side edge of the inner end of the body 52 is formed with a recess 52b which extends circumferentially. The holding member 51 is formed with a plurality of bolt insertion holes 51a (only one of which is shown) which extend therethrough in the axial direction, at circumferentially-spaced intervals. Further, the holding member 51 is formed with a plurality of rivet insertion holes 51b (only one of which is shown) having a diameter smaller than that of the bolt insertion holes 51a at respective locations where they do not overlap the bolt insertion holes 51a, at circumferentially spaced-intervals. The holding member 51 configured as described above is rigidly fixed to the flywheel 11 by the rivets 19 inserted through the respective associated rivet insertion holes 51b, with the recess 52b of the body 52 being engaged with the protrusion 11d of the first flywheel 11, and then rigidly fixed to the crankshaft 2 by the bolts 20 inserted through the respective associated bolt insertion holes 51a, together with the first flywheel 11 and the damping mechanism cover member 21.

The cam member 54 also has an annular shape, and has a generally T-shaped cross-section. The cam member 54 is comprised of a base portion 55 extending in the radial direction, and a protruding portion 56 protruding from the base portion 55 in the axial direction toward the transmission. The inner end of the base portion 55 is formed with a plurality of spline teeth 55a that extend in the axial direction, and are spline-engaged with the spline grooves 52a of the body 52, respectively. This makes the cam member 54 movable with respect to the holding member 51 in the axial direction. Further, the transmission-side end of the protruding portion 56 extends into the aforementioned recess 53a of the collar 53, and a plurality of spline grooves 56a extending in the axial direction are formed in the entire outer peripheral surface of the protruding portion 56, at circumferentially-spaced intervals.

Further, a coned disc spring 57 (spring member) is disposed between the cam member 54 and the first flywheel 11. One end of the coned disc spring 57 is fixedly engaged with an engaging portion 11f provided on a transmission-side surface of the inner end of the first flywheel 11, and the other end thereof is in contact with the engine-side surface of the cam member 54, whereby the coned disc spring 57 urges the cam member 54 toward the transmission. Further, between the outer end of the base portion 55 of the cam member 54 and the outer end of the collar 53 of the holding member 51, there are disposed e.g. four first friction plates 58 and three second friction plates 59, in a manner arranged alternately in the axial direction. The two types of plates 58 and 59 are both in the form of an annular plate, and the first friction plates 58 have an inner end formed with a plurality of spline teeth 58a at circumferentially-spaced intervals. The spline teeth 58a are spline-engaged with the aforementioned spline grooves 56a of the cam member 54. Further, the second friction plates 59 also have an outer end formed with a plurality of spline teeth 59a at circumferentially-spaced intervals, which are spline-engaged with the aforementioned spline grooves 12e of the second rotary mass member 12. Further, the cam member 54 is urged toward the transmission by the coned disc spring 57, whereby the first and second friction plates 58 and 59 are sandwiched between the base portion 55 of the cam member 54 and the collar 53 of the holding member 51.

The inner end of the base portion 55 of the cam member 54 and a portion of the holding member 51 inward of the recess 53a of the collar 53 are opposed to each other in the axial direction. The opposed side surfaces of the inner end of the base portion 55 and the portion of the holding member 51 are sloped such that they come closer to each other as they extend outward in the radial direction, whereby the gap therebetween becomes progressively narrower outward in the radial direction. The space surrounded by the opposed side surfaces of the holding member 51 and the cam member 54 and so forth accommodates a multiplicity of weight balls 60 having a predetermined weight, which are held therebetween in a state in contact with the side surfaces thereof.

The damping mechanism 50 configured as described above is covered with the damping mechanism cover member 21 from the transmission side. The damping mechanism cover member 21 is also in the form of an annular plate, and fixed to the body 52 of the holding member 51 via bolt insertion holes 21a and rivet insertion holes 21b, using the aforementioned bolts 20 and rivets 19. Further, the damping mechanism cover member 21 is similar to the coned disc spring 57, and the outer end thereof is engaged with a recess 12f formed at a transmission-side edge of the inner end of the second flywheel 12 and extending circumferentially, and urges the second flywheel 12 toward the engine via the recess 12f. With this configuration, space that is surrounded by the first and second flywheels 11 and 12, the bush bearing 18, the holding member 51, and the damping mechanism cover member 21 and has the first and second friction plates 58 and 59 and so forth arranged therein is hermetically closed. The hermetically closed space is filled with grease for smooth operation of the damping mechanism 50.

The friction clutch 3 is e.g. of a dry single plate type, and comprised of a clutch disk 40, a diaphragm spring 42 urging the clutch disk 40 against the second flywheel 12 via a pressure plate 41, a release bearing, not shown, for driving the diaphragm spring 42, and a cover 44 attached to the second flywheel 12.

The clutch disk 40 is spline-connected to the input shaft 4 of the transmission such that the clutch disk 40 and the input shaft 4 are axially movable but not rotatable with respect to each other. Further, the clutch disk 40 has friction disks 40a and 40a mounted on respective opposite sides thereof, at a location ranging from a central portion to an outer end thereof, such that they extend between the second flywheel 12 and the pressure plate 41. Further, the outer end of the diaphragm spring 42 is in contact with a surface of the pressure plate 41 opposite from the clutch disk 40. The diaphragm spring 42 is comprised of a plurality of leaf springs (only one of which is shown) which extend like spokes, with an inner end thereof connected to the release bearing, and an intermediate portion thereof supported by the cover 44 via a support 42a. The release bearing is connected to a clutch pedal, not shown, via a release arm, not shown.

With the arrangement described above, the torque of the engine is transmitted sequentially from the crankshaft 2 via the flywheel device 1 and the friction clutch 3 to the input shaft 4 of the transmission. When the clutch pedal is not stepped on, the clutch disk 40 is pressed against the second flywheel 12 by the urging force of the diaphragm spring 42, whereby the friction clutch 3 is engaged to transmit the rotation of the crankshaft 2 to the input shaft 4 of the transmission. Further, when the clutch pedal is stepped on, the release bearing is pressed toward the second flywheel 12 by the release arm, whereby the outer end of the diaphragm spring 42 is moved in a direction away from the clutch disk 40. As a result, the pressure plate 41 moves away from the clutch disk 40, whereby the friction clutch 3 is disengaged to allow the second flywheel 12 to freely rotate with respect to the input shaft 4 of the transmission.

Further, in the flywheel device 1, the torque of the engine is transmitted from the first flywheel 11 to the second flywheel 12 through respective two paths via the damping mechanism 50 and the spring mechanism 30, and in this process, the proportion of parts of torque transmitted via the two mechanisms 50 and 30 varies with the engine speed as follows:

When the engine speed is in a low rotational speed region, the centrifugal force acting on the weight balls 60 of the damping mechanism 50 is small, so that the urging force of the weight balls 60 acting on the cam member 54 is also small. Therefore, a component of this urging force in the axial direction is also small, which enables the urging force of the coned disc spring 57 to hold the first and second friction plates 58 and 59 in a state pressed against each other. This causes sufficiently large frictional forces to act between the friction plates 58 and 59, and hence the first and second flywheels 11 and 12 are rotated in unison via the damping mechanism 50, whereby the torque of the engine is transmitted mainly through the path via the damping mechanism 50.

On the other hand, as the engine speed rises, the rotational speed of the crankshaft 2 increases, so that the centrifugal force acting on the weight balls 60 increases to also increase the component of the urging force of the weight balls 60 acting on the cam member 54 in the axial direction. The increase in the component of the urging force causes the cam member 54 to be driven in the axial direction toward the engine by the weight balls 60 as they are moved outward in the radial direction against the urging force of the coned disc spring 57. As a result, the urging force acting on the first and second friction plates 58 and 59 sandwiched by the cam member 54 and the holding member 51 decreases, so that the frictional forces between the friction plates 58 and 59 also decrease to diminish the torque transmitted to the second flywheel 12 via the damping mechanism 50.

An amount of torque corresponding to the decrease in the amount of torque transmitted via the damping mechanism 50 is transmitted via the spring mechanism 30 to the second flywheel 12 in a state reduced in torsional vibrations of the crankshaft 2. Thus, torque transmitted via the damping mechanism 50 progressively decreases with rise in the engine speed until the weight balls 60 are brought into contact with the protruding portions 56 of the cam member 54, whereas torque transmitted via the spring mechanism 30 progressively increases.

Next, a description will be given of how to assemble the flywheel device 1. The flywheel device 1 is assembled using the first flywheel 11 as a base and in a manner stacking the associated components thereon, following a procedure described below: First, the bush bearing 18 is mounted in the groove 14 outward of the first flange 11b of the first flywheel 11, or on the flange 12c of the second flywheel 12, by press-fitting the same such that it extends along the bottom and the side wall of the groove 14. Then, the spring holders 33 are inserted into the opposite ends of each torsion spring 31, and then set them at predetermined locations on the first flywheel 11.

Then, the sealing member 22 on the engine side is disposed on the second flange 11c, and then the spring-receiving flange 32 is placed on the sealing member 22 on the engine side by causing the arm portions 32a to be engaged with the ends of each torsion spring 31. Then, the sealing member 22 on the transmission side is placed at the same radial location as that of the sealing member 22 on the engine side with the spring-receiving flange 32 sandwiched between the sealing members 22, followed by filling the spring mechanism-accommodating chambers with grease. Then, the spring mechanism cover member 16 is placed at a predetermined location on the spring mechanism 30, and then the outer end of the spring mechanism cover member 16 and the end of the peripheral wall 11e of the first flywheel 11 are welded together. Subsequently, the rivets 23 are inserted through the rivet insertion holes 16a, 11h, and 32c of the spring mechanism cover member 16, the first flywheel 11, and the spring-receiving flange 32, and an end of each rivet 23 is riveted, whereby the mounting of the spring mechanism 30 on the first flywheel 11 is completed.

Next, the inner end of the coned disc spring 57 is engaged with the engaging portion 11f of the first flywheel 11. Then, the cam member 54, the first friction plates 58, and the second friction plates 59 are placed in this order on the coned disc spring 57, at respective predetermined locations. In doing this, it is advisable to use a jig so as to align the spline teeth 59a of the second friction plates 59 in the circumferential direction. Next, the body 52 of the holding member 51 is disposed on the first flywheel 11 such that the spline grooves 52a thereof are spline-engaged with the spline teeth 55a of the cam member 54, and the recess 52b of the body 52 is fitted on the protrusion 11d of the first flywheel 11. In doing this, it is advisable to use a jig so as to align the insertion holes 51a and 11g of the body 52 and the first flywheel 11. Next, a multiplicity of the weight balls 60 are disposed in the space between the body 52 and the cam member 54, and then grease is filled around the first and second friction plates 58 and 59. Then, the collar 53 is placed at a predetermined location on the body 32.

Then, the second flywheel 12 is slid in the axial direction while causing the spline teeth 32*d* of the spring mechanism 30 and the spline teeth 59*a* of the damping mechanism 50 to be spline-engaged with the spline grooves 12*d* and 12*e* thereof, thereby placing the second flywheel 12 on the first flywheel 11. Next, the damping mechanism cover member 21 is set at a predetermined location on the damping mechanism 50, and finally, the rivets 19 are inserted through the rivet insertion holes 21*b*, 51*b*, and 11*h* of the over member 21, the holding member 51, and the first flywheel 11, and the engine-side ends of the rivets 19 are riveted, whereby the damping mechanism 50 is fixed to the first flywheel 11. This completes the assembly of the flywheel device 1. The procedure described above makes it possible to assemble the fly wheel device 1 with accuracy and ease.

According to the flywheel device 1 constructed as described above, between the first flywheel 11 provided on the crankshaft 2 and the second flywheel connected to the input shaft 4 via the friction clutch 3, there is disposed the spring mechanism 30 which transmits the torque of the engine while reducing torsional vibrations of the crankshaft 2 to the input shaft 4 of the transmission. Further, the groove 14 is formed in one of the opposed surfaces of the first and second flywheels 11 and 12 and the groove 14 is formed in the other of the same such that the groove 14 and the flange 12*c* extend circumferentially and the flange 12*c* is fitted in the groove 14. These are pressed by the friction clutch 3 which connects the second flywheel 12 to the input shaft 4, and disposed at approximately the same radial location as that of the friction surface 12*b* of the second flywheel 12. Within the groove 14, the bush bearing 18 is provided which is sandwiched in the axial direction by the groove 14 and the flange 12*c*, and supports the flywheels 11 and 12 such that they are rotatable with respect to each other. Further, when the friction clutch 3 is engaged, the urging force acting on the friction surface 12*b* of the second flywheel 12 is supported by the first flywheel 11 via the bush bearing 18 sandwiched between the flange 12*c* of the second flywheel 12 and the groove 14.

As described above, the friction surface 12*b*, and the groove 14 and the flange 12*c* are at approximately the same radial locations as that of the friction clutch 3, that is, the location where the urging force of the friction clutch 3 acts and the location of the support which supports the urging force are substantially aligned with each other in the axial direction, and the first and second flywheels 11 and 12 support the urging force in unison with each other. Therefore, it is possible to suppress bending (falling) of the two flywheels 11 and 12 in the direction of urging of the friction clutch 3. This makes it possible to maintain the stable operation of the flywheel device 1. Further, since the first and second flywheels 11 and 12 are fitted to each other via the flange 12*c* and the groove, the flywheels 11 and 12 can be accurately and easily positioned in the axial and radial directions with respect to each other only by simply fitting the flange 12*c* and the groove 14 with each other when the flywheel device 1 is assembled. Therefore, inspection after the assembly can be simplified, for example, to thereby reduce the cost of manufacturing management. Further, since the bush bearing 18 supports the two flywheels 11 and 12 in a manner rotatable with respect to each other, it is possible to ensure the stable relative motions of the flywheels 11 and 12 can be ensured, and the effects of damping torsional vibrations by the spring mechanism 30.

Moreover, the groove 14 is formed between the first and second flanges 11*b* and 11*c* which are radially parallel with each other and extend in the circumferential direction, and the flange 12*c* of the flywheel 12 is fitted in the groove 14. This makes it possible to secure space between the flywheels 11 and 12 on opposite sides of the first and second flanges 11*b* and 11*c* in the radial direction, and the spring mechanism 30 and the damping mechanism 50 are disposed in the space, whereby the entire flywheel device 1 can be formed compact in size. Further, as described above, the urging force from the friction clutch 3 is supported by the flywheels 11 and 12, and does not directly act on the spring mechanism 30 and the like, so that it is possible to stably ensure the effects of damping torsional vibrations by the spring mechanism 30.

Furthermore, the torque of the engine is transmitted to the input shaft 4 of the transmission via the torsion springs 31 provided on the flywheel 11, and the spring-receiving flange 32 that is engaged with the torsion springs 31 and spline-engaged with the spline grooves 12*d* formed in the flange 12*c* of the second flywheel 12. This makes it possible to effect the spline engagement of the spring-receiving flange 32 with the flange 12*c* of the second flywheel 12 only by engaging one end of the spring-receiving flange 32 with the spline grooves 12*d* formed in the outer peripheral surface of the flange 12*c* and sliding the same thereon, whereby assembly of the first flywheel 11 including the spring mechanism 30 is facilitated. This contributes to simplified assembly of the flywheel device 1. Further, due to the spline engagement between the flange 12*c* and the spring-receiving flange 322, a desired play (backlash) can be set to the mating therebetween. This makes it possible to increase the freedom of setting damping characteristics of the spring mechanism 3 in damping torsional vibrations, e.g. configuring the settings of the response of the spring mechanism 30 against the torsional vibrations.

The torsion springs 31 and the spring-receiving flange 32 in engagement therewith are covered by the spring mechanism cover member 16, and the one end of the spring-receiving flange 32 protrudes toward the flange 12*c* beyond the spring mechanism cover member 16 such that it can be spline-engaged with the spline grooves 12*d* of the flange 12*c*. Further, the torsion springs 31 are enclosed by the first flywheel 11 and the spring mechanism cover member 16 provided thereon, and the sealing members 22 hermetically seal between the spring mechanism cover member 16 and the spring-receiving flange 32 and between the spring-receiving flange 32 and the first flywheel 11.

As described above, by providing the spring mechanism cover member 16 and the sealing members 22, it is possible to easily hermetically seal the torsion springs 31 in a state enclosed by the spring mechanism cover member 16 and so forth. This makes it possible to prevent leakage of grease filled in the spring mechanism-accommodating chambers in which the torsion springs 31 are accommodated, and thereby positively ensure smooth operation of the spring mechanism 30. Further, since the gaps between the spring-receiving flange 32 and the first flywheel 1, and between the spring-receiving flange 32 and the spring mechanism cover member 16 can be eliminated, it is possible to restrict the axial motion of the spring-receiving flange. This makes it possible to cause the spring mechanism 30 to stably operate, so that the smoother operation of the spring mechanism 30 can be ensured.

According to the flywheel device 1, the spring mechanism 30 is disposed between the first flywheel 11 provided on the crankshaft 2 and the second flywheel 12 provided on the input shaft 4, for damping the torsional vibrations of the crankshaft 2. Further, at a location inward of the spring mechanism 30 in the radial direction of the crankshaft 2, there is disposed the damping mechanism 50 which generates rotational resistance between the first and second flywheels 11 and 12. More specifically, when the engine speed is low, the urging force of the coned disc spring 57 causes the cam member 54 movable in the axial direction to press the first and second friction plates 58 and 59, whereby frictional forces are generated between the first and second friction plates 58 and 59. The frictional forces act as rotational resistance between the first and second friction plates 58 and 59. This damps the torsional vibrations which tend to occur between the flywheels 11 and 12 when the engine speed is low.

A multiplicity of the weight balls 60 held between the cam member 54 and the holding member 51 that press the first and second friction plates 58 and 59 move the cam member 54 in a direction away from the two friction plates 58 and 59 against the urging force of the coned disc spring 57 through a stoke dependent on the rise in the engine speed, whereby the frictional forces between the friction members 58 and 59 are reduced. That is, the magnitude of rotational resistance between the first and second flywheels 11 and 12 is determined by the relationship between the urging force of the coned disc spring 57 and the engine speed, and as the engine speed rises, the proportion of torque transmitted via the damping mechanism 50 decreases, whereas the proportion of torque transmitted via the spring mechanism 30 increases, whereby the damping of the torsional vibrations can be effectively attained when the engine speed is high.

Further, since the cam member 54 is moved by the weight balls 60, the stroke thereof is continuously changed according to the engine speed, so that the damping mechanism 50 can smoothly change the rotational resistance between the first and second flywheels 11 and 12 in a manner following the change in the engine speed. Therefore, the proportion between respective parts of torque of the engine transmitted via the spring mechanism 30 and the damping mechanism 50 is changed smoothly according to the engine speed. This makes it possible to cause the spring mechanism 30 and the damping mechanism 50 to perform damping of the torsional vibrations of the crankshaft 2 in a proper proportion dependent on the engine speed. Thus, the torque can be stably transmitted to the input shaft 4 irrespective of the engine speed.

Further, as described hereinbefore, the damping mechanism 50 is disposed inward of the spring mechanism 30 in the radial direction of the crankshaft 2. The spring mechanism 30 is mainly composed of coil springs and hence is relatively light in weight, whereas the damping mechanism 50 is composed of lots of parts as described hereinabove, and hence is heavy in weight. Therefore, according to the present invention, by disposing the spring mechanism 30 light in weight at an outer location and the damping mechanism 50 heavy in weight at an inner location, the weight distribution of the flywheel device 1 can be biased toward the axis of the crankshaft 2. This makes it possible to reduce the moment of inertia of the flywheel device 1. As a result, the torsional moment acting on the joints between the flywheel device 1, and the crankshaft 2 of the engine and the input shaft 4 of the transmission can be reduced, which contributes to the increased durability of the drive system including the flywheel device 1.

Further, since the damping mechanism 50 is composed of lots of parts, as described above, depending on variations in the dimensional accuracy and assembly accuracy of each part, variation in the weight or mass distribution of the assembled damping mechanism 50 is also liable to occur. However, even in such a case, due to disposition of the damping mechanism 50 at a location closer to the crankshaft 2, the moment of inertia of the entire flywheel device 1 is less affected by such variation. This reduces variation in rotational characteristics of the flywheel device 1 caused by variations in the weight and the like of the damping mechanism 50. Therefore, it becomes unnecessary to provide strict control on the weight of each part so as to preserve uniformity thereof, so that it is possible to reduce the control cost of parts subjected to mass production, and hence reduce the manufacturing costs of the flywheel device 1.

Further, differently from the conventional friction device in which the friction shoe is moved in the radial direction to thereby generate rotational resistance, the damping mechanism 50 causes the cam member 54 to be moved in the axial direction to thereby generate the rotational resistance between the flywheels 11 and 12. Therefore, it is not necessary to secure a very large length in the radial direction. This makes it possible to configure the damping mechanism 50 such that it is compact in size in the radial direction, and hence increase the freedom of arrangement of the spring mechanism 30.

Further, the second friction plates 59 can be spline-engaged engaged with the second flywheel 12 only by causing them to be engaged with the spline grooves 12e formed in the inner peripheral surface of the opening 12a of the second flywheel 12, and sliding them in the axial direction, which makes it possible to mount the second friction plates 59 on the second flywheel 12 with ease. This makes it possible to simplify the assembly of the flywheel device 1.

Also, the first flywheel 11 and the holding member 51 can be assembled by causing the protrusion 11d and recess 52b thereof to be fitted to each other. Therefore, in assembling the flywheel device 1, it is not only possible to mount the flywheel 11 on the holding member 51 only by fitting the protrusion 11d of the former in the recess 52b of the latter, but also to position the two components 11 and 51 with accuracy. This makes it possible to simplify inspection after the assembly, to thereby reduce the cost of manufacturing management.

Moreover, the inner end of the coned disc spring 57 in an annular form arranged around the crankshaft 2 is fixedly engaged with the engaging portion 11f formed on the first flywheel 11. This configuration enables the positioning of the coned disc spring 57 to be easily carried out only by causing the coned disc spring 57 to be fixedly engaged with the engaging portion 11f, thereby facilitating assembly of the flywheel device 1.

Furthermore, the urging force of the friction clutch 3 provided between the second flywheel 12 and the input shaft 4 acts on the second flywheel 12 via the friction surface 12b thereof. Further, the first and second friction plates 58 and 59 of the damping mechanism 50 are arranged at locations displaced in the radial direction from the friction surface 12b of the second flywheel 12. Therefore, when the friction clutch 3 is engaged, the urging force caused thereby is prevented from directly acting on the friction plates 58 and 59 via the second flywheel 12. That is, the frictional forces generated between the first and second friction plates 58 and 59 depend only on the relationship between the engine speed and the urging force of the coned disc spring 57 but are not adversely affected by the urging force of the friction clutch 3, and hence the frictional forces do not influence the proportion of parts of the torque distributed between the spring mechanism 30 and the damping mechanism 50. This makes it possible to preserve the effects of damping torsional vibrations dependent on the engine speed. Further, the friction plates 58 and 59 are no longer pressed against each other or against other members by the urging force of the friction clutch 3, which prevents excessive frictional forces from being generated between the friction plates 58 and 59, and therefore it is possible to enhance durability of the damping mechanism 50, and hence that of the flywheel device 1.

Further, the damping mechanism 50 is covered with the damping mechanism cover member 21 mounted on the flywheel 11 via the holding member 51 and the like. Therefore, it is possible to prevent foreign matter from entering the damping mechanism 50 without hindering the damping of torsional vibrations by the spring mechanism 30 and the damping mechanism 50, and ensure smooth operation of the damping mechanism 50. Furthermore, the damping mechanism cover member 21 is mounted such the first and second friction plates 58 and 59 are hermetically sealed, which makes it possible to prevent leakage of grease, to thereby more positively ensure the smoother operation of the damping mechanism 50.

Further, the first flywheel 11, the holding member 51, and the damping mechanism cover member 21 can be easily mounted on the crankshaft 2 of the engine by common bolts 20 inserted through the bolt insertion holes 11g, 51a, and 21a formed therethrough. Further, only by aligning the bolt insertion holes 11g, 51a, and 21a of the three components 11, 51, and 20, it is possible to position them with respect to the crankshaft 2 with accuracy, and hence reduce cost of manufacturing management.

It should be noted that the present invention is by no means limited to the above-described embodiment, but can be practiced in various forms. For example, although in the embodiment, the spring mechanism 30 and other associated parts are provided on the first flywheel 11, and the flange 12c is provided on the second flywheel 12c, this is not limitative, but inversely, the spring mechanism 30 and other associated parts may be provided on the second flywheel 12c, and the flange 12c may be provided on the first flywheel 11. Similarly, although in the embodiment, the first flywheel 11 and the second flywheel 12 are formed with the protrusion 11d and the recess 12f, respectively, this is not limitative, but the protrusion 11d and the recess 12f may be formed in the opposite arrangement. Further, the angles of slopes of the axially opposed side surfaces of the base portion 55 of the cam member 54 and the collar 53 of the holding member 51 may be set to values different from those of the embodiment, thereby changing the magnitude of component of force acting from the weight balls 60 on the cam member 54. Further, although in the embodiment, both the side surfaces opposed to each other are sloping surfaces, this is not limitative, but one of them may be a sloping surface. This also makes it possible to cause the component of force in the axial direction to act on the cam member 54.

Furthermore, although the above-described embodiment is an example of application of the flywheel device 1 according to the present invention to the drive system of an automotive vehicle, this is not limitative, but the present invention can also be applied to drive systems of other industrial machines, such as ship propulsion machines, e.g. an outboard motor having a vertically-disposed crankshaft.

It is further understood by those skilled in the art that the foregoing is a preferred embodiment of the invention, and that various changes and modifications may be made without departing from the spirit and scope thereof.

What is claimed is:
1. A flywheel device for a prime mover, disposed between an output shaft of the prime mover and a driven shaft driven by the output shaft, for transmitting torque of the prime mover to the driven shaft, while reducing torque variation and torsional vibrations, comprising:
   a first rotary mass member provided on the output shaft;
   a second rotary mass member connected to the driven shaft;
   a spring mechanism connected between said first rotary mass member and said second rotary mass member, for damping torsional vibrations of the output shaft; and
   a damping mechanism disposed inward of said spring mechanism in a radial direction of the output shaft, and connected between said first rotary mass member and said second rotary mass member, for generating rotational resistance between said first rotary mass member and said second rotary mass member,
   wherein said damping mechanism includes:
   a cam member provided such that said cam member is movable in an axial direction along an axis of the output shaft;
   a holding member disposed in a manner opposed to said cam member in the axial direction;
   first and second friction members disposed between said cam member and said holding member, such that said first and second friction members are connected to said first rotary mass member and said second rotary mass member, respectively, and engaged with each other;
   a spring member urging said cam member toward said first and second friction members to thereby cause frictional forces to be generated between said first and second friction members due to pressing of said first and second friction member by said cam member; and
   a weight member held between said cam member and said holding member, such that as the rotational speed of the prime mover rises, said weight member causes said cam member to be moved in a direction away from said first and second friction members against the urging force of said spring member, to thereby reduce the frictional forces, wherein
   said first rotary mass member and said holding member have bolt insertion holes formed therethrough at respective locations corresponding to each other, and are mounted on the output shaft using common bolts inserted though the insertion holes.

2. A flywheel device as claimed in claim 1, wherein said second rotary mass member has an annular shape having an opening coaxial with the axis of the output shaft, and has a spline groove formed in an inner peripheral surface of the opening such that the spline groove extends in the axial direction, and
   wherein said second friction member is engaged with the spline groove of said second rotary mass member.

3. A flywheel device as claimed in claim 1, wherein one of said first rotary mass member and said holding member has a protruding portion protruding toward the other of said first rotary mass member and said holding member, and
   wherein the other of said first rotary mass member and said holding member has a recess formed at a location opposed to said protruding portion in the axial direction, for having said protruding portion fitted therein.

4. A flywheel device as claimed in claim 1, wherein said first rotary mass member further has an engaging portion for having said spring member mounted thereat, and
   wherein said spring member comprises a coned disc spring having an annular shape and disposed around the output shaft, said coned disc spring having an inner end fixedly engaged with said engaging portion of said first rotary mass member.

5. A flywheel device as claimed in claim 1, wherein said second rotary mass member is connected to said driven shaft via a friction clutch, and has a friction surface on which acts the urging force of said friction clutch, and said first and second friction members are disposed at respective locations displaced in the radial direction of the output shaft from the friction surface.

6. A flywheel device as claimed in claim 1, further comprising a cover member provided on one of said first rotary mass member and said second rotary mass member, for covering said damping mechanism.

7. A flywheel device as claimed in claim 1, further comprising a cover member for covering said damping mechanism,
wherein said cover member has bolt insertion holes formed therethrough at respective-locations corresponding to the locations of the bolt insertion holes in the first rotary mass member and the holding member, and said cover member is mounted on the output shaft using common bolts inserted through the insertion holes.

\* \* \* \* \*